3,533,839
PROCESS FOR SEPARATING FRUCTOSE
FROM GLUCOSE
Kazuo Hara, 179-3 Mamekuchidai, Naka-ku, Yokohama-shi, Japan, and Toshitomo Baba, 7-8 Fujigaya 4-chome, Kugenuma, Fujisawa-shi, Japan
No Drawing. Filed Feb. 3, 1967, Ser. No. 613,723
Claims priority, application Japan, Feb. 16, 1966, 41/8,892
Int. Cl. C13k *1/00, 9/00*
U.S. Cl. 127—42                                      18 Claims

ABSTRACT OF THE DISCLOSURE

Process for separating fructose admixed with glucose comprising treating the mixture thereof with anhydrous absolute ethanol containing anhydrous calcium chloride to extract the fructose as an anhydrous addition compound with calcium chloride and to leave the glucose unextracted.

BACKGROUND OF THE INVENTION

This invention relates to a process for manufacturing fructose from various raw materials containing fructose along with glucose and/or other sugars and related compounds, such as invert sugar, isomerized sugar, honey or, hydrolyzate of inulin. More particularly this invention relates to a process for manufacturing fructose in high purity as well as in good yield from various raw materials as above described, wherein fructose may be separated almost quantitatively from other materials by virtue of formation of its addition compounds with some inorganic compounds. In one aspect this invention also relates to a process for manufacturing certain addition compound of fructose with inorganic compounds which are usable as such. In another aspect this invention also relates to a process for separating fructose from other monosaccharides, for example, such as glucose, mannose or galactose, and disaccharides, for example, such as sucrose, maltose or lactose.

DESCRIPTION OF THE PRIOR ART

Heretofore in production of fructose on a commercial scale one of the most serious problems has been lack of an efficient and economical method for separation of fructose from glucose. Although processes which have been proposed and even actually industrialized for the separation of fructose from glucose none of them has been free from various difficulties and disadvantages. Since fructose and glucose so closely resemble one another in physical and chemical characteristics, most reagents and solvents fail to separate them satisfactorily. The prior art processes can hardly produce high purity fructose economically. For example, lime which can form sparingly soluble calcium fructosate has long been recommended almost exclusively as the most suitable precipitant for fructose. Because the precipitation conditions are not only very delicate to manipulate, but also usually incapable for complete separation of fructose from glucose so that the fructose obtained is in most cases so-called "uncrystallizable sugar," the basicity of the lime un-desirably causes decomposition of fructose resulting in additional lowering of the yield of fructose which may not be high from the first owing to incomplete precipitation of fructose as calcium fructosate. Thus in practice this lime process has not been economical. In view of the difficulties encountered in the separation of fructose and glucose, in other processes proposed, for example, such as oxidation process or fermentation process, it has been also suggested to destroy glucose alone oxidation or fermentation leaving fructose unattacked and in a recoverable state. But in these processes fructose is also inevitably sacrificed to an undesirable extent, and further it is not always easy to separate fructose from the oxidation or fermentation products of glucose and other impurities. Thus these processes also appear to be uneconomical, if not impracticable, from the industrial viewpoint. Indeed, the fact that the market price of fructose is always exceptionally high all over the world speaks eloquently of how difficult it is to separate fructose from glucose for the production of fructose on a commercial scale.

SUMMARY OF THE INVENTION

It is therefore an object of this invention to provide a process for manufacturing fructose from various raw materials containing fructose along with glucose or other sugars and related compounds, such as invert sugar, isomerized sugar, honey or hydrolyzate of inulin which contain fructose along with glucose and/or other sugars including monosaccharides, e.g., mannose or galactose and disaccharides, e.g., sucrose, maltose or lactose.

It is another object of this invention to provide a process for manufacturing fructose in high purity and in good yield from various raw materials as above described by simple and easy operations.

It is still another object of this invention to provide a process for separating fructose from other sugars such as other monosaccharides including mannose, galactose, and disaccharides including sucrose, maltose or lactose.

It is further another object of this invention to provide certain addition compounds with inorganic compounds which are usable as such.

Other objects and advantages of this invention will become apparent from the following description.

In the course of investigation of various chemical behaviors of fructose and glucose it was discovered that when these monosaccharides are anhydrous they may be easily differentiated from one another by a very simple treatment.

First, it was found that fructose is slightly soluble in anhydrous ethanol whereas glucose is almost insoluble in the absence of anhydrous calcium chloride. Fructose becomes enhancedly soluble in anhydrous ethanol in the presence of anhydrous calcium chloride, while glucose is still insoluble. This phenomenon, of course, suggests that differing from glucose, fructose can form an addition compound with calcium chloride which is fairly soluble in anhydrous ethanol. To our much greater surprise, an entirely unexpected fact was further discovered in the case where a fructose-anhydrous ethanol anhydrous calcium chloride system was treated with addition of water. That is to say, it was found that when a certain amount of water was added to a solution of fructose in anhydrous ethanol containing anhydrous calcium chloride, a large amount of white crystalline precipitate was formed after a little while, but water added in small excess soon dissolved the pricipitate completely again. By repeated and more precise experimentation it was finally confirmed that in a quaternary system consisting of fructose, calcium chloride, ethanol, and water the solubility of an addition compound of fructose and calcium chloride exhibits a unique behavior of showing a sudden precipitation in a very narrow range of aqueous content, that is, in the vicinity of about 15% by volume on the basis of the total solvent volume. In spite of this behavior of fructose it was found that glucose is quite soluble in the presence of calcium chloride in such a range of aqueous content of the ethanol-water mixture, and even in coexistence with fructose, glucose alone is soluble, without interfering with fructose under the conditions above defined, although it should become difficultly soluble in more concentrated ethanol. These facts were all investigated by the aid of observation of optical rotation and later confirmed also by chemical analysis to establish a novel process for manufacturing fructose from various materials containing fructose along with glucose.

DESCRIPTION OF THE PREFERRED EMBODIMENTS

To the accomplishment of the foregoing and related objects the process of this invention comprises the features hereinafter fully described.

According to the invention there is provided a process for separating fructose from glucose when they are in admixture in an anhydrous state or may be obtained as a mixture in such a state which comprises treating the mixture with at least about five times as much as the estimated amount of the fructose by weight of anhydrous ethanol which contains at least six times as much as the estimated amount by weight of the fructose of anhydrous calcium chloride, and filtering off the undissolved glucose. In this treatment heating should be avoided, because at elevated temperatures glucose also enters into solution rendering its separation from fructose incomplete. Therefore the temperature employed is ambient, i.e., from 0° to 35° C. and more preferably 10–25° C. The amount of the calcium chloride required for dissolving fructose is at least 60% as much as the estimated amount of the fructose by weight. This probably suggests that the addition compound of fructose with calcium chloride which is soluble in anhydrous ethanol is $C_6H_{12}O_6 \cdot CaCl_2$. After removal by filtration of the undissolved glucose, which may be recovered as such after washing with anhydrous ethanol, the ethanolic filtrate containing fructose and calcium chloride may further be treated as later described to settle out the fructose as a precipitate of an hydrated addition compound in another form, e.g., $(C_6H_{12}O_6)_2 \cdot CaCl_2 \cdot 2H_2O$ by adding a small amount of water thereto. Alternately, the ethanolic filtrate may also be dried up by evaporation of ethanol to leave the addition compound, e.g.,

$$C_6H_{12}O_6 \cdot CaCl_2$$

along with excess calcium chloride in a solid state. Fructose itself may be completely isolated from these addition compounds or the mixture of fructose and calcium chloride in a solid state as described in the later part of this specification.

If the raw materials containing fructose along with glucose are in the form of aqueous solution or obtained as aqueous solution, the aqueous content should be as small as possible in order to secure good results and to save ethanol, which is the only expensive material in the process of this invention. However, even at an aqueous contact as high as 80% the process is still operable, that is, the amount of ethanol to be later added is not so much as to make the process uneconomical. To the aqueous solution of the raw fructose as above described calcium chloride is added in an amount ranging from 15% to 100%, preferably from 30% to about 60% by weight of the estimated amount of fructose present, and thoroughly mixed with agitation to effect dissolution. Then ethanol is added to the resulting solution until the volume ratio of ethanol to water falls nearly within a range of about 95:5 to 70:30, and again thoroughly mixed with agitation. In most cases, the addition compound of fructose with calcium chloride, $(C_6H_{12}O_6)_2 \cdot CaCl_2 \cdot 2H_2O$, soon begins to precipitate in a white crystalline form, but it is very often found that the precipitation does not occur unless some seed crystals of the addition compound are poured into the solution and agitated for a while. The precipitate is very stable, nonhygroscopic, and readily filterable, and more favorably it is not very much contaminated with glucose and other impurities except that some quantity of calcium chloride may adhere under normal operation conditions. After several tens of minutes to several hours or overnight at room temperature the precipitate is filtered and washed with 85% (by volume) ethanol or more preferably with 85% (by volume) ethanol containing a quantity of anhydrous calcium chloride to obtain the addition compound of fructose with calcium chloride in an almost completely pure state.

In order to recover the fructose itself from the addition compound obtained as above it is dissolved in nearly an equal amount by weight of water and the calcium chloride is removed either as such by means of an ion exchange resin treatment, or by converting said calcium chloride into calcium sulfate by double decomposition with alkali metal sulfate, ammonium, sulfate or sulfuric acid, followed by filtration of said calcium sulfate and removal of the other salts or acid then formed by means of an ion-exchange resin treatment and finally by concentrating the resulting solutiton until a concentrated aqueous solution is obtained. The best result is achieved by converting the calcium choride into calcium sulfate and hydrochloric acid by adding an equivalent amount of sulfuric acid and subsequently by removing the hydrochloric acid after filtering off the calcium sulfate, with anion exchange resin followed by further treatment with mixed anion and cation exchange resins for removal of small amounts of other salts which still remain before concentrating the fructose solution.

In the above practice of the process of this invention the temperature employed is ambient, preferably 10–25° C., and neither low temperature nor cooling is needed as in the lime process. At low temperatures such as 0–5° C. the addition compound of fructose with calcium chloride appears to change its crystal form and so its filtration becomes rather more difficult than at ambient temperature such as 10–25° C. on the other hand, at elevated temperatures the yield of the addition compound appreciably falls.

The calcium chloride used in the process of this invention may be any commercial product available provided it is suitable for anhydrous use. Although commercial products of calcium chloride contains various impurities such as iron chloride, aluminum chloride, zinc chloride and sodium chloride. These impurities are all harmless in practice of the process of this invention. Even when 3–5% of these impurities were admixed with calcium chloride purposely no obstacle was experienced.

The ethanol used in the process of this invention may be any commerical ethanol or recovered ethanol which contains no water or at most a few percent of water in an unavoidable case. The water-containing ethanol, however, cannot be used for separation of fructose and glucose in an anhydrous state in the presence of calcium chloride.

The ethanol used in the process of this invention may also contain certain amounts of methanol, except where fructose and glucose are separated in an anhydrous state in the presence of calcium chloride. Usually about 5% by volume of methanol contained in ethanol is quite harmless, but about 20% by volume of methanol lowers the yield of the addition compound of fructose to about 80% in the case where about 95% yield is obtained by methanol-free ethanol. The more the methanol the less the yield, but a mixture of about equal volumes of methanol and ethanol still gixes about 60% of yield.

In the process of this invention the solvent particularly used is ethanol unless methanol is mixed within a permissible range from the above result. Therefore it is not only nontoxic to human bodies in contrast with methanol which has often been used in the prior art process for manufacturing fructose, but also less volatile than methanol, so that no appreciable evaporation loss occurs in the process of this invention, and furthermore ethanol may be readily recovered in a high efficiency by distillation from the spent liquor in the process of this invention.

Besides the ethanol, the glucose separated from fructose may also be readily recovered as a byproduct in the process of this invention. But in view of its low market price at present, its recovery from the calcium chloride-containing ethanolic solution would not be so profitable under the present circumstances.

In the above description, calcium chloride is particularly referred to as the inorganic compound which is capable of informatiton of an addition compound with fructose in the process of this invention, but it was found that some other inorganic compounds also behave in the same manner as calcium chloride. For example, in anhydrous ethanol calcium bromide and iodide act as calcium chloride so that they may be utilized for separation of fructose and glucose in an anhydrous state similarly to calcium chloride. But unfortunately, these calcium salts cannot be utilized in aqueous ethanol to precipitate the addition compound with fructose, because they do not deposit such an addition compound under the circumstances where calcium chloride does deposit its addition compound.

On the other hand, it was also found that in aqueous ethanol, strontium chloride is the only compound which exhibits the same behavior as calcium chloride among the compounds of the other members of the same alkaline earth metal group as calcium, because no magnesium compounds and barium compounds proved to deposit the addition compound under similar conditions.

When strontium chloride is employed in place of calcium chloride for the formation of the addition compound with fructose in the process of the invention, the removal of strontium chloride from the addition compound may be carried out in the same manner as that for calcium chloride as previously described.

In the process of this invention it is also very advantageous that other monosaccharides, for example, as mannose and galactose, and disaccharides, for example, sucrose, maltose and lactose, behave in the same manner as glucose in aqueous ethanol, so that it is very easy to separate fructose from these sugars, and their presence does not interfere with the separation of fructose and glucose except that lactose very often deposits its own insoluble compound only on standing over a prolonged period of time.

The fructose obtained in accordance with the process of this invention is very pure as measured by optical rotation, and characteristically readily crystallizable from concentrated aqueous solution in spite of the fact that heretofore fructose has been known to be very difficultly crystallizable from aqueous solution. This indicates that the prior art product of fructose has not been pure enough to readily crystallize owing to contamination mainly of small amounts of glucose and other impurities, whereas the product of fructose produced in accordance with the process of this invention is free from such contamination.

In the process of this invention the yield of fructose is considerably high. If a solution of fructose as the raw material contains water in the ratio of water to fructose by weight the yield of the addition compound, $$(C_6H_{12}O_6)_2 \cdot CaCl_2 \cdot 2H_2O$$

is usually about 95% or higher, and the overall yield of fructose is usually above 90%.

DESCRIPTION OF THE PREFERRED EMBODIMENT

In order to disclose the nature of this invention still more clearly, the following examples will be given. It is to be understood that the invention is not to be limited to the specific conditions or details set forth in these examples except insofar as such limitations are specified in the appended claims. Parts given are parts by weight, unless otherwise specified.

Example 1

In this example solubility of fructose and glucose in anhydrous ethanol in the presence of anhydrous calcium chloride was tested. Anhydrous fructose and glucose and mixture thereof were treated with anhydrous ethanol at ambient temperature in the presence of anhydrous calcium chloride and thoroughly mixed for some time and then whether fructose was dissolved or not was confirmed by measuring optical rotation. As shown in Table 1, 0.5 g. of fructose completely dissolves in 5–10 cc. of anhydrous ethanol containing 0.3 g. of anhydrous calcium chloride, whereas 0.5 g. of glucose almost completely does not dissolve in 10 cc. of anhydrous ethanol containing 0.3 g. of anhydrous calcium chloride, and moreover from a mixture of 0.5 g. of fructose and 0.5 g. of glucose the former alone almost completely enters into solution by treatment with 10 cc. of anhydrous ethanol containing 0.6 g. of anhydrous calcium chloride.

TABLE I

| Amount of sugar taken | | Amount of $CaCl_2$ added (grams) | Amount of anhydrous ethanol used (cc.) | Result of observation |
|---|---|---|---|---|
| Fructose (grams) | Glucose (grams) | | | |
| 1. 0.5 | 0.0 | 0.3 | 10 | Completely soluble. |
| 2. 0.5 | 0.0 | 0.3 | 5 | Completely soluble. |
| 3. 0.0 | 0.5 | 0.3 | 5 | Insoluble. |
| 4. 0.0 | 0.5 | 0.3 | 10 | Insoluble. |
| 5. 0.5 | 0.5 | 0.6 | 10 | Fructose is completely soluble but glucose is insoluble. |

Example 2

In this example the effect of the aqueous content in water-ethanol mixture upon the separation of fructose and glucose by the formation of addition compounds was investigated using fructose, glucose, and calcium chloride in a ratio of 0.5 g.:0.5 g.:0.6 g., respectively, against 10 cc. of total volume of water and ethanol. When the aqueous content was lower than 15% by volume 0.5 g. of anhydrous crystalline fructose and 0.5 g. of anhydrous crystalline glucose were first dissolved in 10 cc. of ethanol of respectively predetermined aqueous content containing 0.6 g. of anhydrous calcium chloride and thoroughly mixed so as to dissolve out the fructose as much as possible, and then the solid material dissolved in the resulting solution was tested with its specific rotation by a (see the values marked by *t* in Table 2) tentative method as later described. On the other hand, the solution obtained as above was also diluted with additional water so to increase the aqueous content to 15% by volume, which resulted in formation of precipitate of the addition compound of fructose with calcium chloride, so that the precipitate was also tested with its specific rotation (see the values marked by * in Table 2) similarly. When the aqueous content was 15% or higher, the sample sugar mixture was first dissolved in a small volume of water that was preliminarily calculated along with calcium chloride in a ratio as above described, and then a preliminarily calculated volume of anhydrous ethanol was added thereto to give an ethanolic solution of a predetermined aqueous content. By this operation the addition compound of fructose with calcium chloride was soon formed, so that after allowing a few hours for settling, the solution was filtered, and the solid material in the filtrate and the precipitate were tested with their specific rotation similarly.

In order to measure the specific rotation under the above circumstances the presence of calcium chloride was very objectionable because it strongly affected the specific rotation of sugars. So that in this example a simple and convenient procedure, though somewhat rough and inaccurate, was adopted. Namely the calcium chloride present was replaced with potassium chloride by double decomposition with potassium carbonate in aqueous medium, and after removal of almost all of water by evaporation the resulting product was treated with anhydrous ethanol and the ethanolic solution of sugars containing minute amounts of inorganic salts was filtered and dried and the resulting mass was subjected to test for specific rotation. Therefore the results thus obtained are never essentially accurate, but as shown in Table 2, they can afford valuable informations on the effect of the aqueous content of water-ethanol mixture upon the efficiency of the separation of fructose and glucose in the process of this invention and different behaviors of fructose and glucose in aqueous ethanol containing calcium chloride though by a rough trend.

TABLE 2

| | +Aqueous content (percent by volume), specific rotation | | | | | |
|---|---|---|---|---|---|---|
| | 0 | 5 | 10 | 15 | 20 | 40 |
| $[\alpha]_D^{20}$ of solid material in solution (°) | −91.8 | −65 | −60 | +25 | −18 | −19.5 |
| $[\alpha]_D^{20}$ of precipitate (°) | −91.5 | −91.0 | −91.5 | −91.5 | −78 | −42 |

To explain the above results in Table 2, the fact that solid material in solution shows the highest levo-rotatory value, −91.8°, in 0% aqueous content indicates that in the absence of water fructose completely dissolves in ethanol, and the gradual decrease in this levo-rotatory value with the increase in aqueous content up to 10% indicates the gradually increasing solubility of glucose probably with the simultaneous decrease in solubility of fructose owing to beginning of deposition as the addition compound with calcium chloride. The abrupt change in sign of the specific rotation in 15% aqueous content is very interesting because it may be fully accounted for by considering that in the very vicinity of this aqueous content most of fructose almost suddenly deposits as the addition compound with calcium chloride while glucose is almost completely retained in solution so that the specific rotation is strongly dextro-rotatory. Reappearance of levo-rotatory values in still larger aqueous contents implies that fructose begins to dissolve again with the increase in aqueous content while the glucose concentration remains almost unchanged.

On the other hand, the specific rotation of the precipitate indicates that the sugar in the precipitate consists almost completely of fructose alone without contamination of glucose and invariably the same addition compound is precipitated whenever precipitation is carried out in an aqueous content of 15% by volume whether that agueous content was reached from the ethanolic side by addition of water or from the aqueous side by addition of anhydrous ethanol. The lower levo-rotatory values found in larger aqueous contents reveal that some quantities of glucose also coprecipitates with fructose as the aqueous content increases.

In view of the above results it is sure that the aqueous content which enables the most efficient separation of fructose and glucose is in the vicinity of about 15% by volume But as the above experiment is somewhat lacking accuracy and moreover as particularly in industrial practice an exact adjustment of such an aqueous content is not so feasible and even unnecessary, we should rather prefer an aqueous content range within which fructose rich precipitate is obtainable from the industrial viewpoint instead of one particular content. Thus we realize that such a range is to be taken as 5% to 30% by volume. The reason why the range was extended down to 5% is that when these lower aqueous contents are reached from the ethanolic side by addition of water the situation entirely differs from that when they are reached from the aqueous side by addition of ethanol, because in the former case glucose is difficultly soluble initially and subsequently it becomes only a little more soluble, while in the latter case glucose considerably dissolves initially but owing to its remarkable tendency of supersaturation it no longer deposits even when a large amount of ethanol is later added. Therefore, in precipitation of the addition compound of fructose, starting from an aqueous raw material, even when anhydrous ethanol is added more or less too much, result is little affected.

Example 3

In this example two aqueous solutions containing 2 g. of fructose and 2 g. of glucose in 3 cc. and 6 cc. of water, respectively, were used as the aqueous raw material. 1.4 g. of anhydrous calcium chloride was added to these solutions and further by adding anhydrous ethanol until the final ethanol concentration was 85%, 80%, and 70% by volume, respectively, on the basis of the total solvent volume, precipitation of the addition compound of fructose was effected. The specific rotation of the sugar contained in the precipitate was measured as in Example 2, and the weight of the sugar then recovered was also noted. The results are shown in Table 3.

As clearly seen from the table, the precipitate obtained in the solution of final ethanol concentration 85%, i.e., of aqueous content 15%, is of the best quality and in the best yield quite concordantly in both cases comparatively examined.

TABLE 3

| Raw material | Final ethanol concentration, percent by volume | | |
|---|---|---|---|
| | 85 | 80 | 70 |
| Fructose, 2 g.; glucose, 2 g.; water, 3 cc.: | | | |
| Specific rotation, $[\alpha]_d^{20}$ degree | −91.5 | −76 | −40 |
| Sugar recovered, percent | ¹ 96 | ¹ 68 | ¹ 32 |
| Fructose, 2 g.; glucose, 2 g.; water, 6 cc.: | | | |
| Specific rotation, $[\alpha]_d^{20}$ degree | −91.0 | −78 | −42 |
| Sugar recovered, percent | ¹ 95 | ¹ 69.5 | ¹ 28.0 |

¹ About.

Example 4

In this example fructose was manufactured from invert sugar on a semicommercial scale. The invert sugar obtained in a routine manner was concentrated by vacuum evaporation to an aqueous content of about 15 parts per 100 parts of dry material after neutralizing the hydrochloric acid used for inversion with calcium carbonate. To 11.5 parts of this aqueous content-adjusted invert sugar (which was yellow-brown liquor) was added 6.7 parts of absolute alcohol which contained 3 parts of anhydrous calcium chloride and was dissolved with agitation. After standing overnight 7.2 parts of pure white crystalline precipitate was obtained by filtration, which was washed with 7 parts of 85% (by volume) ethanol containing 0.4 part of anhydrous calcium chloride thoroughly, when the net yield of the addition compound became 6.5–6.6 parts. The specific rotation $_D^{20}$ of this addition compound was found to be −71° −72° at 20° C. (This is not the specific rotation of pure fructose, because calcium chloride is present in combination.) The analysis of this addition compound, M.P. 112–116° C., gave the following result:

Calculated as $(C_6H_{12}O_6)_2 \cdot CaCl_2 \cdot 2H_2O$ (percent): Cl, 14.2; Ca, 7.9; fructose, 71.0; balance, 7.1. Found (percent): Cl, 14.0; Ca, 8.2; fructose, 70.5; balance, 7.3.

From the above result of the analysis it was confirmed that the addition compound had the composition of $(C_6H_{12}O_6)_2 \cdot CaCl_2 \cdot 2H_2O$. The addition compound obtained as above was dissolved in an equal part of water and the calcium was precipitated with addition of an equivalent amount of sulfuric acid as calcium sulfate which was removed by filtration. The resulting solution of fructose containing then hydrochloric acid in place of calcium chloride was passed through a layer of anion exchange resin, Amberlite IR–45 (Amberlite is a trade name), to remove the hydrochloric acid and subsequently through a mixed layer of anion exchange resin, Amberlite IRA–410 and cation exchange resin, Amberlite IR–120B, to remove all other remaining electrolytes to such an extent that the specific electric resistance of the solution rose to about 1,200,000 Ω. The final solution thus obtained was colorless and transparent and readily crystallized when concentrated to about 87% by weight as fructose. The crystals obtained are pure white and shows the normal specific rotation $_D^{20}$ of −92° at 20° C. The yield of this pure fructose was 4.5–4.6 parts, that is, 90–92% on the basis of the fructose initially present in the raw material.

What is claimed is:

1. A process for separating nonhydrated fructose from nonhydrated glucose present in anhydrous admixture with each other which comprises the steps of:

treating said admixture with anhydrous ethanol
containing an anhydrous calcium halide selected from the group consisting of calcium chloride, calcium bromide, and calcium iodide, thus obtaining an anhydrous extract of a calcium halide addition product of the fructose alone, while leaving the glucose unextracted, separating the unextracted glucose from extract,
adding water to the extract to precipitate the fructose as a hydrated addition compound of said calcium halide,
and filtering the precipitate formed.

2. A process as claimed in claim 1, in which said anhydrous ethanol is used in an amount of at least five times the estimated amount by weight of said fructose and contains said calcium halide in an amount of about six tenths of the estimated amount by weight of said fructose.

3. A process as claimed in claim 1, in which said calcium halide is calcium chloride.

4. A process for separating nonhydrated fructose from nonhydrated glucose present in anhydrous admixture with each other which comprises treating said admixture with anhydrous ethanol
containing an anhydrous calcium halide selected from the group consisting of calcium chloride, calcium bromide, and calcium iodide, thus obtaining an anhydrous extract of a calcium halide addition product of the fructose alone, while leaving the glucose unextracted, separating the unextracted glucose from the extract,
and removing ethanol by evaporation from the extract to recover a mixture of said anhydrous addition product and excess calcium halide.

5. A process as claimed in claim 4, in which said anhydrous ethanol is used in an amount of at least five times the estimated amount by weight of said fructose and contains said calcium halide in an amount of about six tenths of the estimated amount by weight of said fructose.

6. A process as claimed in claim 4, in which said calcium halide is calcium chloride.

7. A process for producing an addition product of fructose with an alkaline earth metal chloride from various raw materials containing fructose along with glucose and other sugars in aqueous medium which comprises the steps of:

adding an alkaline earth metal chloride selected from the group consisting of calcium chloride and strontium chloride to said raw materials in an amount ranging from about 15% to about 100% by weight on the basis of the amount of the fructose present,
adding ethanol to the resulting solution so that the final aqueous content of the solution falls within the range of from about 5% to about 30% by volume on the basis of the total solvent volume, to precipitate the addition compound of fructose with said alkaline earth metal chloride,
and recovering said precipitate by filtering followed by washing with 85% volume ethanol.

8. A process as claimed in claim 7, in which said alkaline earth metal chloride is calcium chloride.

9. A process as claimed in claim 7, in which said alkaline earth metal chloride is strontium chloride.

10. A process as claimed in claim 7, in which the temperature employed is ambient.

11. A process for manufacturing fructose from raw materials containing fructose along with glucose and other sugars in aqueous medium which comprises the steps of:

precipitating fructose as an addition compound with an alkaline earth metal chloride selected from the group consisting of calcium chloride and strontium chloride by adding to said raw materials said alkaline earth metal chloride in an amount ranging from about 15% to about 100% by weight on the basis of the amount of the fructose present.
and adding ethanol to the resulting solution so that the final aqueous content of the solution falls within a range of from about 5% to about 30% by volume on the basis of the total solvent volume;
recovering the fructose itself from the precipitate of said addition compound by dissolving said precipitate in water;
converting said alkaline earth metal chloride to a chloride selected from the group consisting of alkali metal chloride, ammonium chloride, and hydrogen chloride by double decomposition;
removing the resulting chloride by means of adsorption by means of ion exchange resin treatment,
and concentrating the resulting inorganic material-free fructose solution until a readily crystallizable state of fructose is achieved.

12. A process as claimed in claim 11, in which said alkaline earth metal chloride is calcium chloride.

13. A process as claimed in claim 11, in which said alkaline earth metal chloride is strontium chloride.

14. A process as claimed in claim 11, in which said step of precipitating fructose as an addition compound with an alkaline earth metal chloride is carried out at ambient temperature.

15. A process as claimed in claim 11, in which said alkaline earth metal chloride is converted to hydrogen chloride by double decomposition with the addition of an equivalent amount of sulfuric acid.

16. A process as claimed in claim 15, in which said alkaline earth metal chloride is calcium chloride.

17. A process for isolating fructose itself from a hydrated addition product of fructose with calcium chloride which comprises the steps of:

dissolving said addition product in water;
converting the calcium chloride to a chloride selected from the group consisting of alkali metal chloride, ammonium chloride, and hydrogen chloride by double decomposition;
removing the resulting chloride by means of adsorption by means of ion exchange resin treatment;
concentrating the resulting inorganic material-free fructose solution until a readily crystallizable state of fructose is achieved;
and recovering the crystals of the fructose.

18. A process as claimed in claim 17, in which said calcium chloride is converted to hydrogen chloride by double decomposition with the addition of an equivalent amount of sulfuric acid.

References Cited
UNITED STATES PATENTS

| | | | |
|---|---|---|---|
| 2,818,851 | 1/1958 | Khym et al. | 127—46 X |
| 3,130,082 | 4/1964 | Serbia | 127—46 |

OTHER REFERENCES

K. B. Domovs et al.: J. Dairy Sci., 43, 1216–23 (1960).

MORRIS O. WOLK, Primary Examiner

S. MARANTZ, Asistant Examiner

U.S. Cl. X.R.

127—46